US011119563B2

(12) United States Patent
Bodireddy et al.

(10) Patent No.: US 11,119,563 B2
(45) Date of Patent: Sep. 14, 2021

(54) DYNAMIC POWER CAPPING OF MULTI-SERVER NODES IN A CHASSIS BASED ON REAL-TIME RESOURCE UTILIZATION

(71) Applicant: Cisco Technology, Inc., San Jose, CA (US)

(72) Inventors: Vikram Bodireddy, Bangalore (IN); Sriranjan Bose, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 95 days.

(21) Appl. No.: 16/571,758

(22) Filed: Sep. 16, 2019

(65) Prior Publication Data

US 2020/0012334 A1 Jan. 9, 2020

Related U.S. Application Data

(63) Continuation of application No. 15/650,644, filed on Jul. 14, 2017, now Pat. No. 10,423,217.

(51) Int. Cl.
*G06F 1/26* (2006.01)
*G06F 1/3296* (2019.01)
(Continued)

(52) U.S. Cl.
CPC .......... *G06F 1/3296* (2013.01); *G06F 1/3228* (2013.01); *G06F 1/3234* (2013.01);
(Continued)

(58) Field of Classification Search
CPC .... G06F 1/3296; G06F 1/3228; G06F 1/3234; G06F 1/32; G06F 1/3203; G06F 1/3206
(Continued)

(56) References Cited

U.S. PATENT DOCUMENTS 7,032,119 B2 4/2006 Fung
7,418,608 B2 8/2008 Kumar et al.
(Continued)

OTHER PUBLICATIONS

Filani, D., et al. "Dynamic Data Center Power Management: Trends, Issues, and Solutions," Intel Technology Journal, vol. 12, Issue 01, Feb. 21, 2008, 12 pages.

*Primary Examiner* — Volvick Derose
(74) *Attorney, Agent, or Firm* — Polsinelli (57) ABSTRACT

A power management application running in a Chassis Management Controller reads utilization values of each server node dynamically in real time and assigns a respective priority to each server node based on its utilization value. The range of the utilization values is divided into terciles and the corresponding priorities assigned to the terciles are as HIGH, MEDIUM and LOW. The priorities are uses as guidelines for allocating power from a manageable power budget to each server node. A chassis power budget specified by an administrator includes the manageable power and unmanageable power used, for example, to power utilities, such as fans. Care is taken that a HIGH priority server node always receives its maximum power consumption rate, with the LOW priority server node receiving no less than its maximum power consumption rate. The MEDIUM priority server node receives at least the mean between its maximum and minimum power consumption rate.

20 Claims, 5 Drawing Sheets

(51) Int. Cl.
*G06F 1/3228* (2019.01)
*G06F 1/3234* (2019.01)
*G06F 1/32* (2019.01)
*G06F 1/3206* (2019.01)
*G06F 1/3203* (2019.01)
*G06F 1/3287* (2019.01)

(52) U.S. Cl.
CPC .............. *G06F 1/32* (2013.01); *G06F 1/3203* (2013.01); *G06F 1/3206* (2013.01); *G06F 1/3287* (2013.01)

(58) Field of Classification Search
USPC ........................................................ 713/320
See application file for complete search history.

(56) References Cited

U.S. PATENT DOCUMENTS

| | | | | |
|---|---|---|---|---|
| 9,880,599 | B1* | 1/2018 | Allen-Ware | H04L 41/0833 |
| 2006/0053324 | A1* | 3/2006 | Giat | H04L 12/10 |
| | | | | 713/300 |
| 2007/0067657 | A1* | 3/2007 | Ranganathan | G06F 1/3268 |
| | | | | 713/320 |
| 2007/0130341 | A1 | 6/2007 | Ma | |
| 2007/0300083 | A1* | 12/2007 | Goodrum | G06F 1/3203 |
| | | | | 713/300 |
| 2008/0178019 | A1* | 7/2008 | McGrane | G06F 1/26 |
| | | | | 713/320 |
| 2009/0077407 | A1* | 3/2009 | Akimoto | G06F 1/26 |
| | | | | 713/340 |
| 2009/0113221 | A1* | 4/2009 | Hoile | G06F 1/189 |
| | | | | 713/310 |
| 2009/0125737 | A1* | 5/2009 | Brey | G06F 1/3203 |
| | | | | 713/322 |
| 2009/0193276 | A1* | 7/2009 | Shetty | G06F 1/3287 |
| | | | | 713/340 |
| 2009/0299538 | A1* | 12/2009 | Suzuki | G06F 1/3209 |
| | | | | 700/292 |
| 2009/0307512 | A1* | 12/2009 | Munjal | G06F 1/30 |
| | | | | 713/324 |
| 2009/0319808 | A1* | 12/2009 | Brundridge | G06F 1/26 |
| | | | | 713/300 |
| 2010/0037077 | A1* | 2/2010 | Kashyap | G06F 9/5027 |
| | | | | 713/330 |
| 2010/0064151 | A1* | 3/2010 | Saeki | G06F 1/324 |
| | | | | 713/300 |
| 2010/0205469 | A1* | 8/2010 | McCarthy | G06F 9/5094 |
| | | | | 713/324 |
| 2010/0235662 | A1 | 9/2010 | Nishtala | |
| 2011/0113273 | A1* | 5/2011 | Okitsu | G06F 1/3203 |
| | | | | 713/320 |
| 2011/0246807 | A1* | 10/2011 | Brumley | G06F 1/3209 |
| | | | | 713/340 |
| 2012/0072745 | A1* | 3/2012 | Ahluwalia | G06F 1/26 |
| | | | | 713/320 |
| 2012/0137158 | A1* | 5/2012 | Nelluri | H05K 7/1498 |
| | | | | 713/340 |
| 2013/0226362 | A1* | 8/2013 | Jagadishprasad | G06F 9/5094 |
| | | | | 700/297 |
| 2013/0268779 | A1* | 10/2013 | Hueston | G06F 1/3206 |
| | | | | 713/300 |
| 2013/0318371 | A1* | 11/2013 | Hormuth | G06F 1/28 |
| | | | | 713/320 |
| 2013/0339776 | A1* | 12/2013 | Jagadishprasad | G06F 9/5094 |
| | | | | 713/340 |
| 2014/0143558 | A1* | 5/2014 | Kuesel | G06F 1/26 |
| | | | | 713/300 |
| 2014/0181545 | A1* | 6/2014 | Shrall | G06F 1/3206 |
| | | | | 713/320 |
| 2014/0359356 | A1* | 12/2014 | Aoki | G06F 9/485 |
| | | | | 714/24 |
| 2015/0241947 | A1* | 8/2015 | Allen-Ware | G06F 1/3206 |
| | | | | 713/320 |
| 2016/0011914 | A1* | 1/2016 | Bohn | G06F 1/26 |
| | | | | 713/300 |
| 2016/0116975 | A1* | 4/2016 | Takagi | G06F 1/3296 |
| | | | | 713/320 |
| 2017/0277233 | A1* | 9/2017 | Yokoyama | H05K 7/20727 |
| 2017/0308137 | A1* | 10/2017 | Oliveira | G06F 1/263 |

\* cited by examiner

DYNAMIC POWER CAPPING OF MULTI-SERVER NODES IN A CHASSIS BASED ON REAL-TIME RESOURCE UTILIZATION

CROSS-REFERENCE TO RELATED APPLICATION

The instant application is a Continuation of, and claims priority to, U.S. patent application Ser. No. 15/650,644 entitled DYNAMIC POWER CAPPING OF MULTI-SERVER NODES IN A CHASSIS BASED ON REAL-TIME RESOURCE UTILIZATION filed Jul. 14, 2017, the contents of which are herein incorporated by reference in its entirety.

TECHNICAL FIELD

This disclosure relates in general to the field of multi-server nodes in communications networks and, more particularly, to power management on a chassis having multiple server nodes.

BACKGROUND

Managing power consumption and power dissipation of server systems is a major issue for the server industry, particularly due to increasing energy costs and environmental hazards associated with energy consumption. Due to the need to support short-duration, higher-demand periods, many data centers deploy over-configured or higher-performance server systems. Many data centers are therefore underutilized much of the time and operate at much lower performance demands than those for which they are configured. Many data centers also deploy over-configured or higher-performance server systems to simplify procurement and deployment logistics by using a common higher-performance server configuration.

One particular type of system that can benefit from power savings includes large collections of similar devices such as server "farms." Server farms can include tens, hundreds, thousands or more separate computer systems, or servers. The servers are usually interconnected by a common network and are provided with centralized control or management.

Some specific trends have recently emerged in enterprise data center. Users are moving to form factors that focus on higher density of functionality—such as dense computing, dense storage and/or dense input/output (IO). Increasingly, chassis tend to have multiple server nodes, or IO nodes or storage controller nodes. These nodes are either general compute nodes or targeted for specific workloads such as storage, machine learning, artificial intelligence or big data. The nodes may be equipped with general purpose CPU's, such as Intel x86 CPUs, or special purpose field-programmable gate arrays (FPGA) for machine learning or artificial intelligence, or with non-volatile memory for in-memory big data solutions.

Power management on a chassis with multiple compute nodes is more complicated than on a chassis with single compute nodes. This is especially true for special purpose chassis systems like storage servers (example UCS C3260). Such special purpose chassis can be optimized for specific types of workloads, and power management solutions have to cognizant of this factor when making algorithmic decisions for power management. The algorithms have to be sensitive to workload types as well as the underlying node level and chassis level architecture for the workflow of the load. For example, a chassis designed to have multiple plug-in FPGA cards, designed for machine learning workloads, may not show a high CPU workload. Yet, such a chassis will draw a significant amount of power and will require power management. In some cases, the entities drawing the bulk of the power may not even have intrinsic power management capabilities. In such cases, the chassis level algorithm may be configured to incorporate these elements into an overall feedback loop.

In these systems, the nodes may or may not behave independently. This is different from a standard blade server system, where multiple compute nodes inhabit the same chassis with the point of sharing the same infrastructure, such as fans and power, without having the intent of forming any logical functional block using the underlying hardware. In a special purpose chassis system, like a storage server, this is not true. Apart from sharing common infrastructure such as power and cooling, they also share access to storage and input/output (IO) blocks. This means, they can either operate as independent nodes or as combined nodes, sharing the workload and IO using some mutually agreed algorithm, either in shared or failover mode.

The nature of such a special purpose chassis means that any kind of power management solution needs to incorporate this inherent complexity in its design. The power management solution needs to understand the way workloads can be impacted due to the power management implementation.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In a typical multi server node chassis, a major portion of the power is consumed by the compute (CPU, Memory) and input/output subsystems (IO, for example PCIe Adapters) of the server. On a standard blade server chassis, the individual compute blades operate as independent and discrete logical units, sharing the hardware infrastructure such as fans and power supply units (PSU). On specialized function chassis, such as storage servers, the individual compute nodes can be configured to be part of a logical cluster and behave either in shared or failover modes. A special purpose chassis may have nodes that are tuned for a variety for workloads. For example, the nodes may be general purpose compute nodes which have CPU-intensive workloads, or they may have FPGA PCIe cards focused on machine-learning workloads, or they may have IO centric nodes that are focused on storage or big data solutions. Any kind of power control algorithm implemented on such a specialized system needs to be aware of the compute node configuration and handle it accordingly. The algorithm should also incorporate the utilization of specific workload running on the chassis, such as CPU, IO or memory. In some cases, the algorithm might have to take a weighted average of the different types of utilization as a part of the feedback loop.

One key requirement is obtaining the utilization data of the different nodes, such as CPU, IO or memory. For example, on systems using Intel x86 based server chips, node management firmware may provide information about the overall platform, CPU, memory or IO utilization. The same can be achieved on other architectures using solutions such as BIOS system management interrupt (SMI) providing the information to baseboard management controller (BMC), or other solutions that can provide this information.

The solution proposed herein makes use of the utilization data from each server and derives the power to be allocated to each node from overall allocated chassis' power budget. The so-determined power allocation is then applied to each server as the power limit value and allows the server's node manager system to throttle the system (CPU, memory, input/output) to operate within the allotted power limit.

Any such power management solution should ideally be able to measure and react to the workload on the individual compute nodes, depending on the configuration of said chassis. This is especially required in configurations, where the nodes might be in a failover mode and the power management needs to prioritize the power being delivered to the active node.

The challenge in accurately allocating power in a multi-server-node chassis lies in detecting the real time resource utilization of each server node, the instantaneous power consumption of the chassis passive components and then calculating the power delivery quantities for each node, continually in the real time mode.

EXAMPLE EMBODIMENTS

Figure 1:
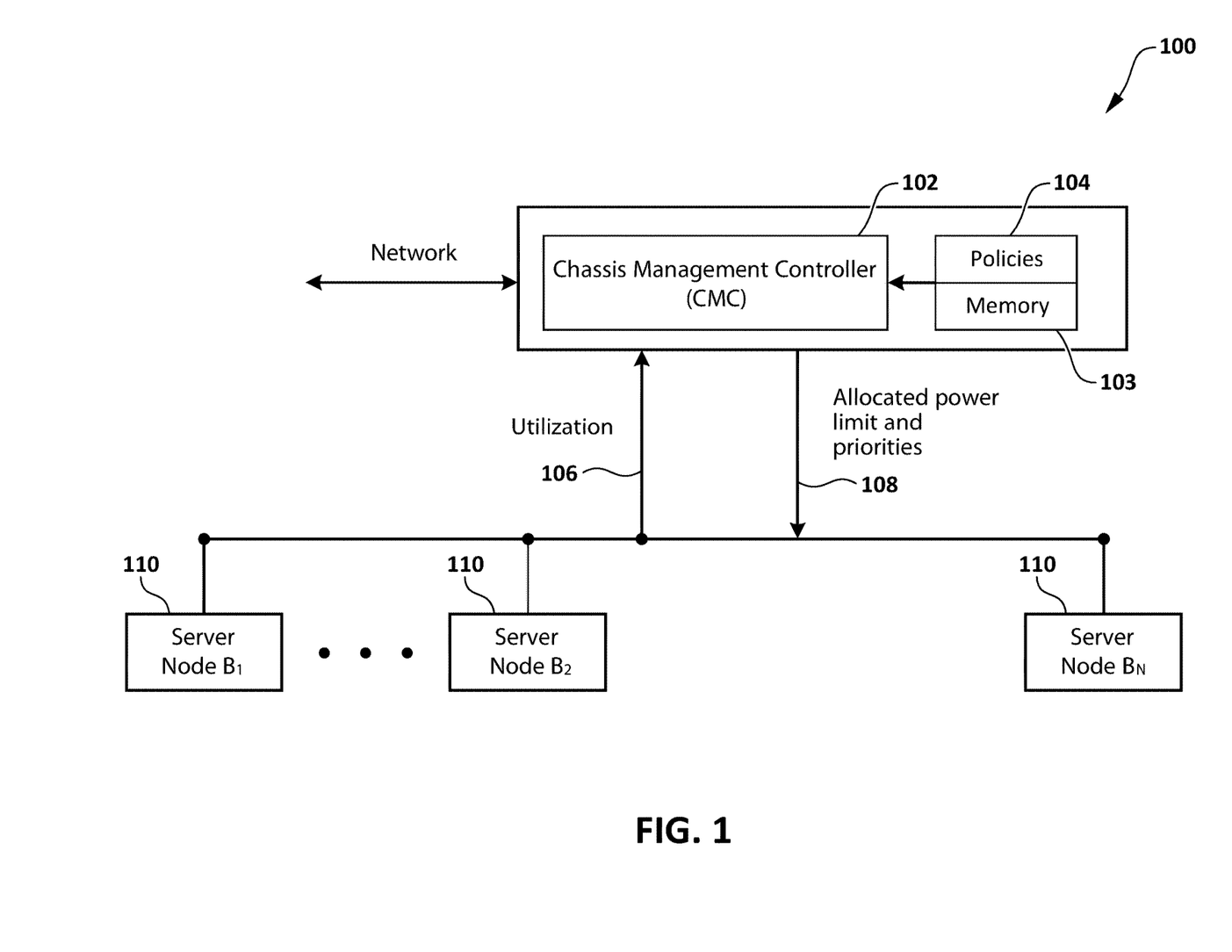
FIG. 1 depicts a logical interface of server nodes to a Chassis Management Controller according to embodiments of the disclosure.

FIG. 1 depicts the logical interface 100 of exemplary server nodes 110 to a Chassis Management Controller (CMC) 102 by which individual server nodes $B_1, B_2 \ldots B_N$ are queried for their respective utilization values and are assigned by CMC an allocated power limit commensurate with their utilization values. The server nodes 110 may be connected to the CMC 102 either individually by way of paths 106 and 108, or by way of a bus. The utilization values are reported by the server nodes 110 to the CMC 102 via path 106, and the corresponding power limits and priorities are assigned by the CMC 102 to the server nodes 110 via path 108. The CMC 102 may be connected to a network. The policies of the CMC 102 for assigning power limits and priorities reside at 104, which may include a memory for storing applicable processes and algorithms.

The power management application (or policies) 104 that runs in the CMC reads each server node's utilization value and assigns priority to each server node based on its utilization value. The assigned or assignable priorities to be discussed in conjunction with this example are "HIGH", "MEDIUM" and "LOW", although a greater number of priorities between "HIGH" and "LOW" may be implemented. The power management application executes a suitable algorithm that distinguishes the server nodes based on these priorities and uses these priorities as guidelines for deriving the power to be allotted to each server node.

An exemplary assignment of priorities is given in Table 1 below.

TABLE 1

| Priority | Server Node CPU Utilization Value ($CPU_i$) | Server Node IO Utilization Value ($IO_i$) in | Server Node Memory Utilization Value ($M_i$) in % |
|---|---|---|---|
| HIGH | 70 to 100 | 70 to 100 | 70 to 100 |
| MEDIUM | 35 to 70 | 35 to 70 | 35 to 70 |
| LOW | 0 to 35 | 0 to 35 | 0 to 35 |

The overall priority can then be calculated for each node based on the importance of workload parameters for the intended usage of the chassis.

The net utilization value $U_i$ is: $U_i = P_{CPU} * CPU_i + P_{IO} * IO_i + P_{Mem} * M_i$, wherein $CPU_i$, $IO_i$, and $M_i$ are defined in Table 1, and $P_{CPU}/P_{IO}$ and $P_{Mem}$ are individual weights be assigned by the system designer, or the end user, depending on the workload being used on the system.

For the purposes of this document, the net utilization value $U_i$ will be used in the ensuing discussion of the algorithm. This will allow the algorithm to be generic enough to handle different nature of workloads, by varying the priorities of the elements being considered for feedback to the algorithm, to decide the importance of each node in the list of all nodes in the chassis. The For example, Intel's Grantley based C-series servers includes as part of a power management application a submodule called Power Characterization (performed by Intel's proprietary Node Manager PTU tool) executing run time calibration of the server nodes' configuration to determine their power requirements. It should be noted that there are multiple other mechanisms to get this data such as running proprietary tuned loads. After successful completion of the power characterization, minimum and maximum power requirements are assigned to the various characterized server nodes as follows:

The minimum power requirement represents the minimum power required for the server node to operate at its optimized performance level.

The maximum power requirement represents the power required for the server node to operate at its full performance level.

The proposed process, which is incorporated in an algorithm, derives and allocates appropriate power to each server node commensurate with these minimum and maximum power requirement ranges. In general, the algorithm first allocates maximum power to the server node with HIGH priority; thereafter, a mean power level between the minimum and maximum power values is allocated to the MEDIUM priority server node; and lastly minimum power is allocated to the server node with LOW priority. The allocated power levels should preferably exceed the minimum power requirements for each server node.

As described above, in a multi-server node chassis, the total power consumption is divided and represented as two types, i.e. manageable power consumption and unmanageable power consumption. The power consumption of the server nodes is referred to as manageable when their power consumption can be controlled to a set power limit. The remaining passive chassis power consumption is then treated as unmanageable power consumption. The unmanageable power consumption together the manageable component power consumption is referred to as the chassis power budget.

All of the power allocations are to be done and managed within the chassis power budget, wherein the total chassis power budget is specified by an administrator and lies between the chassis minimum power and the chassis maximum power. The algorithm performs the power allocations within this specified chassis power budget and at the same time continuously monitors the run time unmanageable power consumption of the chassis. Any unused power of the total chassis power budget is dynamically, i.e. in real time, distributed to the manageable power budget for better utilization of the total chassis budget.

Figure 2:
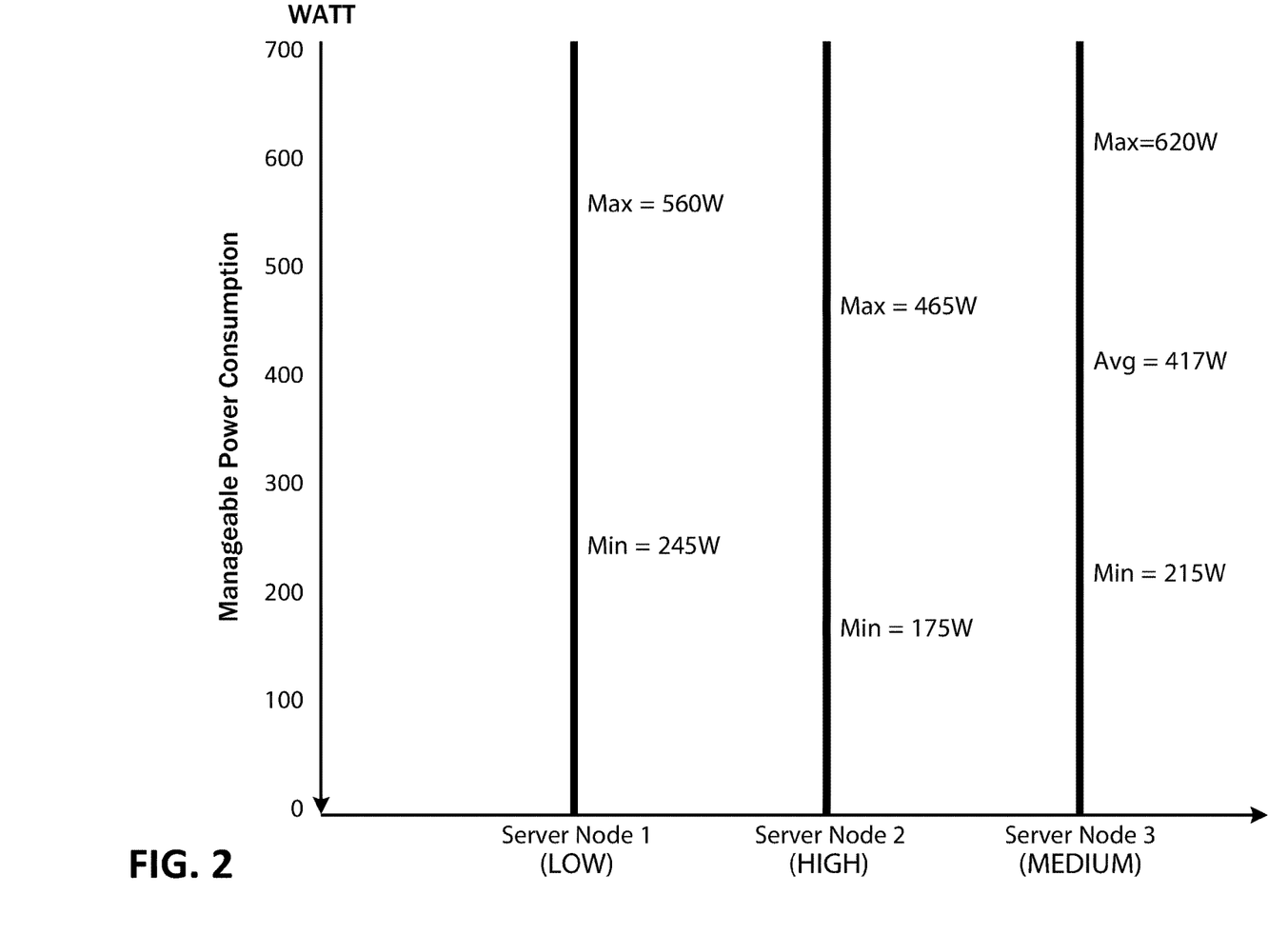
FIG. 2 depicts manageable power consumption for three exemplary server nodes having different priorities according to embodiments of the disclosure.

FIG. 2 shows the power consumption for 3 exemplary server nodes $B_1$, $B_2$, $B_3$ in a chassis. The terms "server" and "server node" will hereafter be used interchangeably, unless otherwise noted. The respective power consumption is monitored, and their exemplary minimum and maximum power requirements are as follows.

Server1_Min=245 Watt
Server1_Max=560 Watt
Server2_Min=175 Watt
Server2_Max=465 Watt
Server3_Min=215 Watt
Server3_Max=620 Watt The maximum manageable power requirement is therefore Total_Chassis_Manageable_Power=Server1_Max+Server2_Max+Server3_Max=560+465+620=1645 Watt.

In addition, the chassis' unmanageable maximum power consumption (Unmanageable_Max_Power) is assumed to be 610 Watt such that the total chassis' minimum and maximum power requirement is:

Chassis_Minimum_Power=Server1_Min+Server2_Min+Server3_Min+Unmanageable_Max_Power=245+175+215+610=1245 Watt, and.

Chassis_Maximum_Power=Server1_Max+Server2_Max+Server3_Max+Unmanageable_Max_Power=560+465+620+610=2255 Watt.

The administrator needs to specify a chassis power budget in the above range i.e. between Chassis_Minimum_Power (1245 Watt) and Chassis_Maximum_Power (2255 Watt). The chassis power budget specified by the administrator will be assumed to be 1850 Watt for efficient power management: Chassis_Power_Budget=1850 Watt.

The proposed dynamic power-capping algorithm described herein considers the unmanageable power consumption and furthermore ensures that the power allocation to the server nodes 110 is within the specified chassis power budget value, in this example 1850 Watt.

After reading the unmanageable power consumption, the algorithm reads each server node's utilization value (Serveri_UL) and assigns corresponding priorities in accordance with the priority categories listed in Table 1:

The following utilization values will be assumed:
Server1_UL=25%→Server1_Priority=LOW
Server2_UL=80%→Server2_Priority=HIGH
Server3_UL=55%→Server3_Priority=MEDIUM The current unmanageable power consumption, as read by the chassis management controller, is Current_Unmanageable_Power=375 Watt, with the Unmanageable_Max_Power being 610 Watt, as mentioned above.

Accordingly, the residual power available for allocation at run time becomes Power_Available_for_Allocation= Chassis_Power_Budget−Current_UnManageable_Power=1850−375=1475 Watt.

Each server node is allocated power according to the server's priority: Server2_Priority=HIGH→Server2_Power_ Limit=Server2_Max=465 Watt.

The remaining Power_Available_for_Allocation then becomes 1475−465=1010 Watt.

The remaining power is then allocated to the MEDIUM priority sever node (Server 3) such that the power remaining for allocation to the LOW priority sever node (Server1) is at least equal to the minimum power requirement of the LOW priority server node. Stated differently, if Power_Available_for_Allocation>=Server3_Max+Server1_Min, then Server3_Max (in the present example 620 Watt) is allocated to the MEDIUM priority sever node and the remaining power of 390 Watt, which is greater than Server1_Min (in the present example 245 Watt) is allocated to the LOW priority sever node. Conversely, if Power_Available_for_Allocation<Server3_Max+Server1_Min, then the average power value between Server3_Max and Server3_Min (=mean of Min/Max of Server3) is allocated to the MEDIUM priority sever node and the remaining power is allocated to the LOW priority sever node. Conceivably, the power allocated to the MEDIUM priority sever node could also be boosted at the expense of the LOW priority sever node while always ensuring that the LOW priority sever node receives at least Server1_Min.

Figure 3:
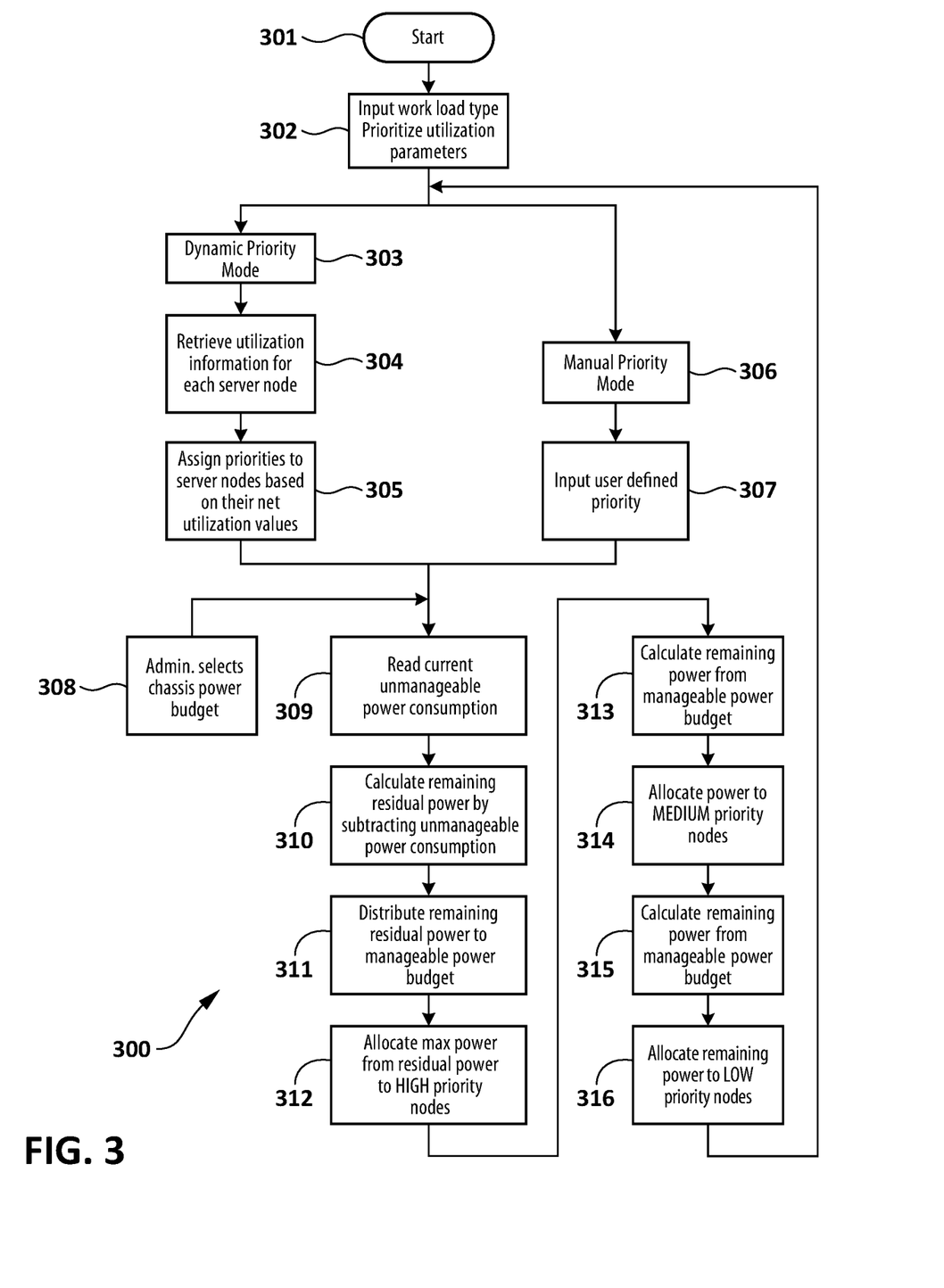
FIG. 3 shows in form of a flow chart an exemplary process flow for power allocation to the exemplary server nodes of FIGS. 1 and 2, according to embodiments of the disclosure.

Turning to FIG. 3, FIG. 3 shows in form of a flow chart an exemplary process flow for power allocation to the exemplary server nodes Server1, Server1 and Server3. The process 300 starts at 301, whereafter the workload types and utilization parameters are inputted and prioritized as described above with reference to Table 1, at step 302. Depending on whether the priorities are assigned dynamically, at steps 303, 304 and 305, or by a user or administrator, steps 306 and 307, the process continues to step 309, where the current unmanageable power consumption of the chassis is read by the CMC. The total power budget for the chassis is selected by an administrator, at step 308, so as not to exceed the maximum power for the chassis. The current unmanageable power consumption is then subtracted from the total power budget for the chassis, at step 310, yielding a residual power representing the manageable power budget for the chassis, which is then distributed by the CMC to the various server nodes in accordance with the proposed algorithm, at step 311.

At step 312, the max power is allocated to the HIGH priority server node to ensure that this server node operates at its full performance level. The power remaining for the MEDIUM priority server and the LOW priority server is the calculated, at step 313, by subtracting the max power allocated to the HIGH priority server from the manageable power budget. At step 314, the power to be allocated to the MEDIUM priority server is then determined depending on the amount of the remaining allocatable power in relation to the power requirements for both the MEDIUM priority server and the LOW priority server, as illustrated in greater detail in the flow chart of FIG. 4.

Figure 4:
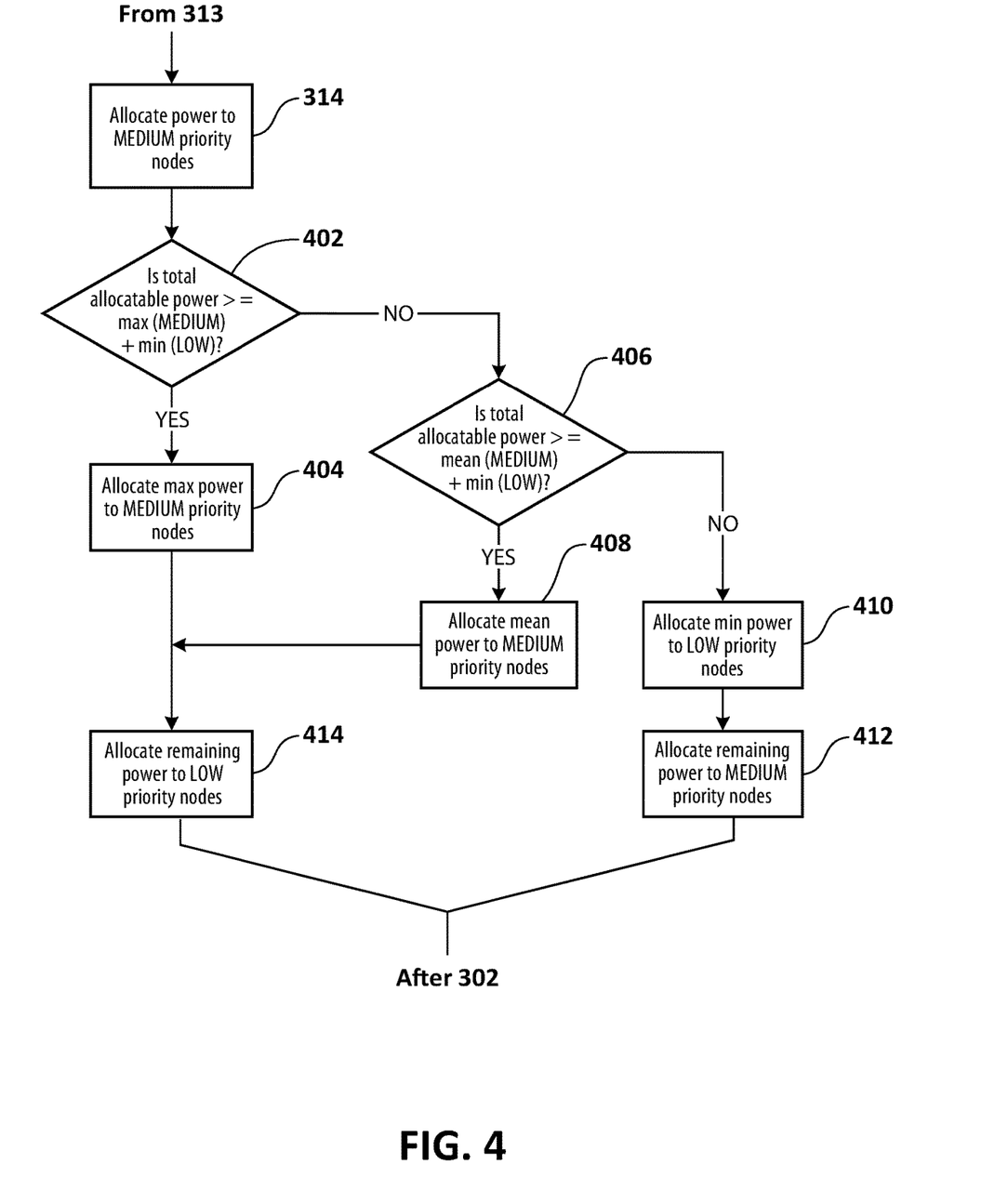
FIG. 4 shows additional details of the exemplary process flow of FIG. 3, according to embodiments of the disclosure.

Turning to FIG. 4, FIG. 4 shows in more detail the steps 314 through 316 of FIG. 3 for different amount of remaining allocatable power after the HIGH priority server nodes receive the maximum power. Following step 314, it is first checked at step 402 whether the total allocatable power is greater than or equal to the max power requirement of the MEDIUM priority server node+the minimum power requirement of the LOW priority server node. If this is the case, maximum power is allocated to the MEDIUM priority server node at step 404, with any remaining power then allocated to the LOW priority server node, at step 414. The process then returns to the connection point after step 302 of FIG. 3. If the total allocatable power is less than the maximum power requirement of the MEDIUM priority server node+the minimum power requirement of the LOW priority server node, as determined at step 402, it is then checked at step 402 whether the total allocatable power is greater than or equal to the mean power requirement (taken as the mean value of the maximum power and the minimum power) of the MEDIUM priority server node+the minimum power requirement of the LOW priority server node. If this is the case, the mean power is allocated to the MEDIUM priority server node, at step 408, with any remaining power then allocated to the LOW priority server node as before, at step 414. In the event that the total allocatable power is less than the mean power requirement of the MEDIUM priority server node+the minimum power requirement of the LOW priority server node, as determined at step 406, the minimum power is allocated to the LOW priority server node to ensure that the LOW priority server node operates at its optimized performance level, at step 410, with the remaining power then allocated to the MEDIUM priority server node, at step 412, assuming that this remaining power for the MEDIUM priority server node is still at least equal to the minimum power requirement of the MEDIUM priority server node. If this is not the case, the administrator may have to increase the chassis power budget, at step 308 in FIG. 3, although this situation should not occur with proper initial selection of the chassis power budget.

Figure 5:
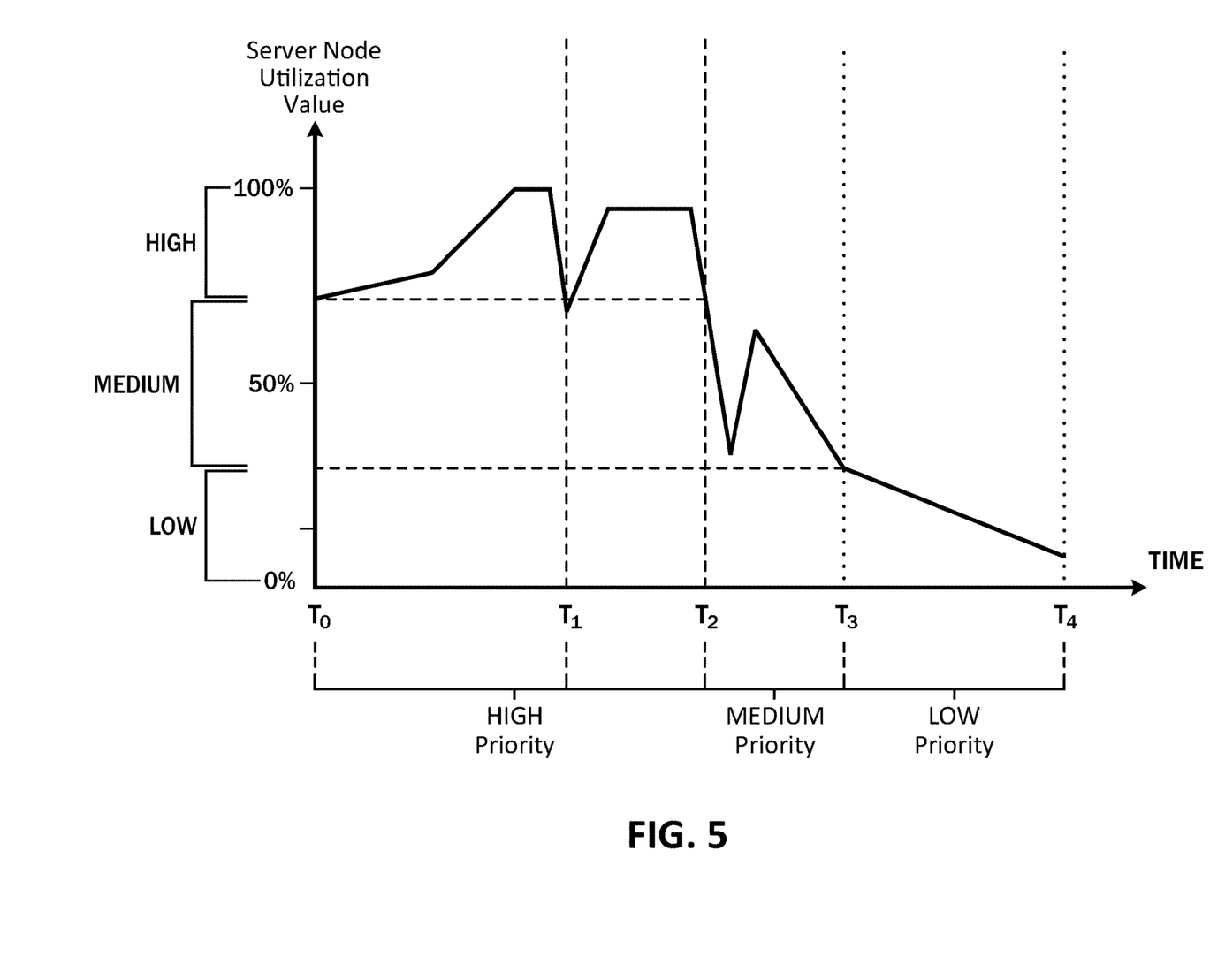
FIG. 5 shows a schematic diagram of an exemplary server node utilization (in percent) versus time for a particular sever node, according to embodiments of the disclosure.

An exemplary graphical plot of server node utilization value (in percent) versus time for a particular sever node is illustrated in FIG. 5. It is assumed that at time zero (T0) the server node utilization value for the particular server node operating in HIGH priority mode is 70% and may rise toward 100%. When the utilization value reaches about 70% and stays above that level for some predetermined (even short) time, control signals are generated by the CMC and received by the server node in order to transition the server node to or maintain the server node at the HIGH priority mode. At time T1, the server node utilization value as a percentage of available capacity suddenly drops for a short time below 70% but then rises again above 70%. Because the utilization value did not remain below 70% for a prescribed period of time, the server node does not transition to the MEDIUM priority mode. However, at a somewhat later time T2, the server node utilization value dropped below 70% for a prescribed time, causing the server node to transition to the MEDIUM priority mode. As utilization continued to decrease to below 30%, the server node transitions to the LOW priority mode occurred. In this exemplary embodiment, the server node utilization value is shows as decreasing more or less steadily. However, the server node utilization value may alternatively remain constant or transition in an arbitrary manner between the various priority modes commensurate with the server nodes utilization value.

Though not shown in FIG. 5, the particular server node and server chassis containing this server node may remain in this LOW priority mode until a higher capacity or utilization value is required for the system as a whole. At such time, control signals are provided to the particular server node to activate the server node into an appropriate utilization state and associated priority. This state may be either a HIGH priority mode or a MEDIUM mode, depending on the utilization and policies in place.

It is noted that although the aforedescribed server node utilization values listed in Table 1, and certain relative periods of time may be inferred from the description or drawings, the server node utilization control and power transition policies may be freely defined to satisfy the dynamics of the system and the conservative or liberal achievement of power conservation within the system. For example, the threshold for transitioning from the HIGH priority mode to the MEDIUM priority mode may be selected to be any server node utilization value between approximately 60% and 100%. In analogous manner, the threshold for transitioning between the MEDIUM priority mode and the LOW priority mode may typically be selected to be a utilization value between any predetermined limits, such as for example between about 30% and 50%. The system may also be structured to that the threshold or thresholds are set or adjusted dynamically. Dynamic thresholding may for example be based at least in part on present, past, and/or predicted future loading, Quality of Service (QOS) indicators or factors, or other measures or parameters.

Although the exemplary implementation of assigning a priority mode to server nodes commensurate with the server node utilization value has been described with reference to three server nodes having different utilization values and priorities (terciles), it will be understood that a chassis may contain any number of server nodes with utilization values that are monitored and change over time. Also, the user may at any given moment decide to change the nature of workload being run on the system, and as such may decide to prioritize a different set of utilization parameters, which will then fed back into the algorithm. In this case, at any given time, a first subset of these server nodes may be in the HIGH priority state, a second subset in the MEDIUM priority state, and a third subset in the LOW priority state. Conceivably, these subsets may be further divided into respective subsets having finer granularity based on additional narrower ranges of server node utilization values. The association of the server nodes with these subsets may change as a function of time, so that different server nodes may then have respective changing utilization values and assigned priorities. Accordingly, each server node in the first subset with HIGH priority then receives maximum power from the manageable power. Each server node in the second subset with MEDIUM priority may then receive at least the respective mean power associated with each server node, in accordance with FIGS. 4 and 5 and as described above, so that the total mean power for all MEDIUM priority server nodes in a chassis becomes at least the sum of the mean power for each server with MEDIUM priority. Likewise, each server node in the third subset with LOW priority then receives at least the minimum power from the remaining manageable power, so that the total power for all LOW priority server nodes becomes at least the sum of the minimum power for each server with LOW priority. Any excess manageable power is distributes as before, as described above with reference to FIG. 5.

Although a separate chassis management controller CMC is illustrated in FIG. 2, it should be understood that the management functionality generally, and the server node control process or algorithm in particular may be implemented by one of the operating server nodes. For example, the control algorithm could be implemented as a software or firmware procedure executing in the CPU and processor of a server node designated according to predetermined rules, policies, or procedures to be the chassis management controller.

The proposed algorithm and its solution is real time based so that it is accurate and reactive in a timely manner, in attaining the power distribution to the server nodes that are in need by their load. This solution also monitors the run time power consumption by the unmanageable components of the chassis and adjusts the residual power towards the server nodes in need that ensures effective utilization of the chassis power budget. The key feature of the algorithm is that it takes into account the nature of multi-node logical configuration on special purpose chassis such as storage servers.

It is known in the art to, for example, increase or decrease a processor clock speed when demands increase and decrease, respectively, or to even turn a server node off when there is no demand. Again, these adjustments may be made automatically based on sensed utilization values.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In some embodiments, at least some portions of the architectures outlined herein may be implemented in software. In some embodiments, one or more of the described features may be implemented in hardware, provided external to these elements, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the chassis management controller CMC 102, the server nodes 110, and other components described and shown herein (and/or their associated structures) may also include suitable interfaces for receiving, transmitting, and/or otherwise communicating data or information in a network environment. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., a memory element 103 in the CMC 102 or a similar unillustrated memory element in one or more of the server nodes 110) may store data used for the operations described herein. Furthermore, the memory element may be able to store instructions (e.g., software, logic, code, etc.) in non-transitory media, such that the instructions are executed to carry out the activities described in this Specification. A processor can execute any type of instructions associated with the data to achieve the operations detailed herein in this Specification. The activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in CMC 102 or server node 110 could be provided in any database, register, table, cache, queue, control list, or storage structure, based on particular needs and implementations, all of which could be referenced in any suitable timeframe.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although CMC 102 or server nodes 110 have been illustrated with reference to particular elements and operations that facilitate the communication process, these elements, and operations may be replaced by any suitable architecture or process that achieves the intended functionality of CMC 102 or server nodes 110.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant does not intend, by any statement in the specification, to limit this disclosure in any way that is not otherwise reflected in the appended claims.

What is claimed is:

1. A method for allocating power to a plurality of server nodes of a computer system comprising:
   assigning to each of the server nodes a priority, the priority including at least first, second and third tiers, the first tier having a highest priority level of the first, second, and third tiers, and the second tier having a higher priority level than the third tier;
   first allocating to the first tier a maximum power requirement of the first tier based on the first tier having the highest priority level;
   first determining based on at least remaining available power after the first allocating and a minimum power requirement of the third tier as a result of the second tier having the higher priority level than the third tier and the remaining available power being greater than the minimum power requirement of the third tier, whether to provide the second tier with either a maximum power requirement of the second tier or only a portion of the maximum power requirement of the second tier; and
   second allocating power to the second and third tiers, the allocated power for the third tier being at least the minimum power requirement of the third tier, and the allocated power for the second tier being based on the first determining.

2. The method of claim 1, wherein the second allocating power comprises, in response to the first determining making a determination that remaining available power exceeds a combination of the maximum power requirement of the second tier and the minimum power requirement of the third tier, allocating to the second tier the maximum power requirement of the second tier and allocating any remaining power to the third tier.

3. The method of claim 1, wherein the second allocating power comprises, in response to the first determining making a determination that remaining available power exceeds a combination of the minimum power requirement of the third tier and a predetermined value based on the maximum power requirement and minimum power requirement of the second tier, allocating partial power to the second tier and allocating any remaining power to the third tier.

4. The method of claim 3, wherein the predetermined value is a mean of the maximum power requirement and minimum power requirement of the second tier, and the partial power is the predetermined value.

5. The method of claim 1, wherein the second allocating power comprises, in response to the first determining making a determination that remaining available power is below a combination of the minimum power requirement of the third tier and a predetermined value based on the maximum power requirement and minimum power requirement of the second tier, allocating to the third tier the minimum power requirement of the third tier and allocating any remaining power to the second tier.

6. The method of claim 1, further comprising:
   second determining a current unmanageable power consumption of the computer system; and
   third determining a current manageable residual power useable for operating the plurality of server nodes.

7. The method of claim 6, further comprising:
   assigning a power budget capable of providing power to the plurality of server nodes between the current unmanageable power consumption and a total of a maximum manageable power to the server nodes and the current unmanageable power consumption and a total of a minimum manageable power to the server nodes.

8. A system comprising:
   a plurality of server nodes, each server node having an activity monitor identifying a server node utilization value, wherein a maximum power consumption rate and a minimum power consumption rate is associated with each server node; and
   a chassis management controller coupled to the server nodes and programmed to perform operations comprising:
      assigning to each of the server nodes a priority, the priority including at least first, second and third tiers, the first tier having a highest priority level of the first, second, and third tiers, and the second tier having a higher priority level than the third tier;
      first allocating to the first tier a maximum power requirement of the first tier based on the first tier having the highest priority level;
      first determining based on at least remaining available power after the first allocating and a minimum power requirement of the third tier as a result of the second tier having the higher priority level than the third tier and the remaining available power being greater than the minimum power requirement of the third tier, whether to provide the second tier with either a maximum power requirement of the second tier or only a portion of the maximum power requirement of the second tier; and
      second allocating power to the second and third tiers, the allocated power for the third tier being at least the minimum power requirement of the third tier, and the allocated power for the second tier being based on the first determining.

9. The system of claim 8, wherein the second allocating power comprises, in response to the first determining making a determination that remaining available power exceeds a combination of the maximum power requirement of the second tier and the minimum power requirement of the third tier, allocating to the second tier the maximum power requirement of the second tier and allocating any remaining power to the third tier.

10. The system of claim 8, wherein the second allocating power comprises, in response to the first determining making a determination that remaining available power exceeds a combination of the minimum power requirement of the third tier and a predetermined value based on the maximum power requirement and minimum power requirement of the second tier, allocating partial power to the second tier and allocating any remaining power to the third tier.

11. The system of claim 10, wherein the predetermined value is a mean of the maximum power requirement and minimum power requirement of the second tier, and the partial power is the predetermined value.

12. The system of claim 8, wherein the second allocating power comprises, in response to the first determining making a determination that remaining available power is below a combination of the minimum power requirement of the third tier and a predetermined value based on the maximum power requirement and minimum power requirement of the second tier, allocating to the third tier the minimum power requirement of the third tier and allocating any remaining power to the second tier.

13. The system of claim 8, further comprising:
   second determining a current unmanageable power consumption of the system; and third determining a current manageable residual power useable for operating the plurality of server nodes.

14. The system of claim 13, further comprising:
assigning a power budget capable of providing power to the plurality of server nodes between the current unmanageable power consumption and a total of a maximum manageable power to the server nodes and the current unmanageable power consumption and a total of a minimum manageable power to the server nodes.

15. A non-transitory computer readable media containing instructions for allocating power to a plurality of server nodes of a computer system, each server node having a server node utilization value, wherein a maximum power consumption rate and a minimum power consumption rate is associated with each server node, the instructions when executed by a system causing the system to perform operations comprising:
assigning to each of the server nodes a priority, the priority including at least first, second and third tiers, the first tier having a highest priority level of the first, second, and third tiers, and the second tier having a higher priority level than the third tier;
first allocating to the first tier a maximum power requirement of the first tier based on the first tier having the highest priority level;
first determining based on at least remaining available power after the first allocating and a minimum power requirement of the third tier as a result of the second tier having the higher priority level than the third tier and the remaining available power being greater than the minimum power requirement of the third tier, whether to provide the second tier with either a maximum power requirement of the second tier or only a portion of the maximum power requirement of the second tier; and
second allocating power to the second and third tiers, the allocated power for the third tier being at least the minimum power requirement of the third tier, and the allocated power for the second tier being based on the first determining.

16. The media of claim 15, wherein the second allocating power comprises, in response to the first determining making a determination that remaining available power exceeds a combination of the maximum power requirement of the second tier and the minimum power requirement of the third tier, allocating to the second tier the maximum power requirement of the second tier and allocating any remaining power to the third tier.

17. The media of claim 15, wherein the second allocating power comprises, in response to the first determining making a determination that remaining available power exceeds a combination of the minimum power requirement of the third tier and a predetermined value based on the maximum power requirement and minimum power requirement of the second tier, allocating partial power to the second tier and allocating any remaining power to the third tier.

18. The media of claim 17, wherein the predetermined value is a mean of the maximum power requirement and minimum power requirement of the second tier, and the partial power is the predetermined value.

19. The media of claim 15, wherein the second allocating power comprises, in response to the first determining making a determination that remaining available power is below a combination of the minimum power requirement of the third tier and a predetermined value based on the maximum power requirement and minimum power requirement of the second tier, allocating to the third tier the minimum power requirement of the third tier and allocating any remaining power to the second tier.

20. The media of claim 15, further comprising:
second determining a current unmanageable power consumption of the computer system; and
third determining a current manageable residual power useable for operating the plurality of server nodes.

* * * * *